US006620045B2

(12) United States Patent
Berman et al.

(10) Patent No.: US 6,620,045 B2
(45) Date of Patent: Sep. 16, 2003

(54) SYSTEM AND METHOD FOR EXECUTING TRADES FOR BONUS ACTIVITY IN GAMING SYSTEMS

(75) Inventors: Bradley Berman, Minneapolis, MN (US); Scott Thomas Just, Maple Grove, MN (US)

(73) Assignee: King Show Games, LLC, Minnetonka, MN (US)

( * ) Notice: Subject to any disclaimer, the term of this patent is extended or adjusted under 35 U.S.C. 154(b) by 114 days.

(21) Appl. No.: 09/839,340

(22) Filed: Apr. 20, 2001

(65) Prior Publication Data

US 2002/0155873 A1 Oct. 24, 2002

(51) Int. Cl.[7] ................................................ G06F 17/00
(52) U.S. Cl. .............................. 463/25; 463/20; 463/29
(58) Field of Search .............................. 463/25, 16, 29, 463/20, 18, 22, 13

(56) References Cited

U.S. PATENT DOCUMENTS 5,100,137 A * 3/1992 Fulton ........................ 273/274
5,868,619 A * 2/1999 Wood et al. ................ 273/292
5,947,820 A 9/1999 Morro et al.
5,976,015 A * 11/1999 Seelig et al. ............ 273/143 R
6,059,289 A 5/2000 Vancura
6,070,873 A * 6/2000 Perkins ....................... 273/292
6,159,098 A 12/2000 Slomiany et al.
6,168,520 B1 1/2001 Baerlocher et al.
6,190,255 B1 2/2001 Thomas et al.
6,312,334 B1 * 11/2001 Yoseloff .................. 273/138.1
6,315,660 B1 * 11/2001 DeMar et al. ........... 273/138.2

FOREIGN PATENT DOCUMENTS

GB 2 222 721 A 3/1990

OTHER PUBLICATIONS

John Scarne, Scarne's New Complete Guide to Gambling, 1974. Simon & Schuster, 356–361, 378–381.*
Examiner Affidavit.*

* cited by examiner

*Primary Examiner*—S. Thomas Hughes
*Assistant Examiner*—Corbett B. Coburn

(57) ABSTRACT

A system and method for allowing gaming device participants to effect trades of payout and other participant credit accumulation for gaming bonus events. A player engages in play of a gaming activity, such as a slot game, which includes a standard mode of play and a bonus mode of play. A trade is proposed of player assets for at least one bonus event. A trade amount is surrendered by the player as part of the trade for the bonus event, and the bonus event is presented to the player for participation, thereby allowing the player to engage in bonus activity otherwise unavailable to the player.

58 Claims, 11 Drawing Sheets

SYSTEM AND METHOD FOR EXECUTING TRADES FOR BONUS ACTIVITY IN GAMING SYSTEMS

FIELD OF THE INVENTION

This invention relates in general to gaming devices, and more particularly to a method and apparatus for affording gaming device participants with selectable options to effect trades of payout and other participant credit accumulation for gaming bonus activities.

BACKGROUND OF THE INVENTION

Gaming devices such as slot machines have been in use in the U.S. for over a century. The earliest slot machines originally paid out in cigars and chewing gum. Remnants of the early slot machines are manifested in the traditional "fruit" symbols such as cherries, lemons, oranges, etc., which represent the original flavors of gum. Notwithstanding the similarity of the symbols and reels associated with the slot machines of both today and yesteryear, modern day slot machine implementations are markedly different than their mechanical ancestors. This dramatic implementation disparity results primarily from the advent of computers and video capabilities.

Pure chance gaming devices such as slot machines have proved wildly popular, and in recent years have rivaled and even surpassed their once untouchable table game counterparts. One reason for this popularity is the increase in innovation, and the recognition of the, need for human stimulation. While true that a primary motivator for people to play gaming devices is the chance to win monetary or other prizes (in the case of legalized gambling), the intrigue and excitement of playing these newly created machines lures people as well. It is therefore important in the gaming industry that innovative gaming devices continue to be rolled out to the playing public.

Commonly referred to as one-armed bandits, the goal of slot machines is to spin the reels so that the symbols on all reels line up on the payline in a winning combination. For multi-lined paylines, a coin or other token may be played for any one or more of the available paylines, and each of the paylines may provide a winning payout. When this occurs, the slot machine pays out according to the payoff table posted on the slot machine. The payoff table informs players of the winning symbol combinations for that machine, and what each combination pays based on the number of coins allocated for the spin. If a winning combination occurs, the machine releases money or tokens into a payout chute, or may award the winning amount onto a credit meter for the player. For example, if a player initially wagered three coins and that player won a high payout, that player may receive fifty coins of the same denomination in return, or may receive fifty credits for continued play.

It is a continual effort to try to find ways to attract and captivate players in playing gaming machines, such as slot games. One such manner of stimulating interest and heightening excitement has been through the use of "bonus" events. Bonus events or games are used to attract and keep players at a gaming machine. A bonus game is typically an additional gaming reel or machine, or a random selection device, that is enabled by a bonus qualifying signal from an underlying or primary gaming machine. Generally, a predetermined prize-winning combination of symbols in an underlying or primary game may result in the player being awarded one or more bonus games. Often the bonus event has a much higher probability of winning, thereby instilling a great interest by players in being awarded bonus events.

There are various known secondary or "bonus" events known in the art. One such bonus event allows the player to depress a bonus spin button to allow the player one or more "free spins" in which a winning payout may be made. Alternatively, additional, discrete bonus reels may be used for the bonus event. In such case, a particular symbol on any one or more of the reels which is stopped on a winning line may result in a winning payout. The reels may be controllable in a bonus play, unlike the underlying primary gaming play. For example, the reels may be individually stopped, and/or the reels may be rotated slower to allow the player to attempt to stop the reel such that the prize-winning symbol stops on the win line. In another example, a bonus event for a video slot machine may have a second screen where the player is rewarded with a bonus game, such as allowing the player to pick one of five different items on the second screen, and the selected item reveals a value won by the player. In recent times, bonus events have become quite extravagant, sometimes leading the player through video animations that provide visual and audio entertainment while providing clever ways in which the participant can receive payouts of varying quantities. After engaging in the bonus event, play resumes in the underlying, primary gaming machine.

Due to the entertainment, excitement and heightened potential for reaping monetary rewards, participants yearn to reach the bonus rounds. Traditionally, this has been the intent of bonus events, to tantalize the participant into continued play to reach the prize of a bonus round. However, the advancement of video gaming devices and sophistication of bonus event activities may have, to many participants, made reaching the bonus round even a greater priority than anticipated. A potential exists for disappointment or frustration by participants of a gaming device that either fails to employ bonus activities, or causes the participant to wait too long before presenting the participant with the more exciting bonus activities.

The present invention recognizes the strong desirability of bonus activities in today's gaming industry, and addresses the need to attract and hold participants' interest through heightened bonus round activity. Accordingly, the present invention addresses the current need in the gaming industry for a manner of augmenting bonus round activities of gaming devices, by establishing a participant-controlled barter system for bonus activity. Thus, the present invention fulfills the aforementioned and other shortcomings of the prior art, and offers a variety of advantages over prior art gaming approaches.

SUMMARY OF THE INVENTION

To overcome limitations in the prior art described above, and to overcome other limitations that will become apparent upon reading and understanding the present specification, the present invention discloses a system and method for affording gaming device participants with selectable options to effect trades of payout and other participant credit accumulation for gaming bonus activities, and alternatively, to trade bonus activities for known payout amounts.

In accordance with one embodiment of the invention, a method is provided for facilitating participation in gaming activity events. The method includes receiving an indication to trade player assets for bonus activity, and an identification of a trade value offered by the player. The trade value is at least a portion of the player assets, which may include a pending winning payout result, credits accumulated through prior winnings, credits resulting from input of cash, tokens, coupons, etc. The trade is executed by accepting the trade value offered by the player, and presenting a bonus activity to the player in response. The player then participates in the bonus activity, and a payout (if any) resulting from participation in the bonus activity is provided.

In accordance with another embodiment, a method in which a player can participate in a gaming activity having at least a standard mode of play and a bonus mode of play is provided. The method includes participation by the player in the standard mode of play. For example, in connection with a slot machine, the standard mode of play would involve placing wagers, spinning the reels, and collecting payouts if the resulting symbol combination(s) is a winning combination. A trade may be initiated, which involves a trade of player gaming assets for bonus events associated with the bonus mode. A trade amount, derived from at least a portion of the player's gaming assets, is identified as a desired trade amount. The trade amount is surrendered by the player in return for participation in the bonus event.

In accordance with another aspect of the invention, a casino gaming apparatus is provided, which hosts a gaming activity having at least a standard mode of play and a bonus mode of play. The gaming apparatus includes a user interface to allow player input of a trade notification while in the standard mode of play, where the trade notification indicates a desire to trade player assets for at least one bonus event associated with the bonus mode of play. A processor is configured to execute the trade by accepting a traded portion of the player assets, and presenting the player with the bonus event in response to acceptance of the traded portion of the player assets. The gaming apparatus may be a slot machine, or other chance-based casino-style gaming machine hosting casino games such as a poker, keno, craps, bingo or other such game.

In accordance with another embodiment, a computer-readable medium having computer-executable instructions for facilitating trade activity in gaming activity events is provided, wherein the computer-executable instructions performing steps including receiving an indication to trade player assets for bonus activity and an identification of a trade value offered by the player. The trade value includes at least a portion of the player assets. The instructions perform a step of executing the trade by accepting the trade value offered by the player and presenting a bonus activity to the player in response. The steps include allowing player participation in the bonus activity, and providing a payout result corresponding to a result of the player participation in the bonus activity. In another embodiment the computer-executable instructions are for facilitating participation in a gaming activity having at least a standard mode of play and a bonus mode of play. Steps include participating in the standard mode of play, initiating a trade of gaming assets for at least one bonus event associated with the bonus mode, identifying a trade amount from the participant's gaming assets in which to trade for the bonus event, surrendering the trade amount in return for participation in the bonus event, and participating in the bonus event.

In accordance with still another embodiment of the invention, a method is provided for facilitating participation in a gaming activity event having at least a standard mode of play and a bonus mode of play. The method includes awarding a bonus event through player participation in the standard mode of play. An indication to trade the awarded bonus event for a payout amount is received, and the trade is executed by disallowing participation of the bonus event and awarding the payout amount to the player.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

In the following description of the invention, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention is directed to a method and apparatus for trading participant gaming assets for bonus event activity. Bonus activity is a gaming event that is auxiliary to the standard play mode of the gaming device. Conventionally, bonus activity occurs automatically, in response to a specific occurrence related to the standard gaming activity. The present invention, on the other hand, provides a way for participants to reach bonus rounds through some measure of participant control. For example, if a gaming machine player wins a certain quantity of credits in connection with a standard play payout, the player may choose to surrender the payout through a trade for the opportunity to participate in a bonus round. The invention includes an indication of a decision by the player to trade credits for bonus activity, and to surrender those credits through execution of the trade. In return, the player is presented with a bonus activity in which the player can participate. Payout results are then provided based on the results of the player's participation in the bonus activity. Alternatively, bonus events awarded through standard gaming activity may be traded for a payout amount that can be added to a accumulation of credits or cashed in.

The present invention, as described more fully below, is applicable to a variety of gaming activities that are played on a gaming machine, including slot games such as reel slots and video slots, electronic poker and other electronic card games, keno, craps, dice, roulette, etc. The present invention is, however, described in large part in the present description in terms of slot machines to provide an understanding of the invention. For example, in the context of slot games/machines, the present invention allows slot game participants to trade payouts or accumulated credits for bonus events, thereby bypassing otherwise standard slot game play to reach a bonus round. While the invention is particularly advantageous in the context of slot machines, and while a description in terms of slot machines facilitates an understanding of the invention, the invention is equally applicable to other gaming activities of chance as will be readily apparent to those of skill in the art from the description provided herein.

Figure 1:
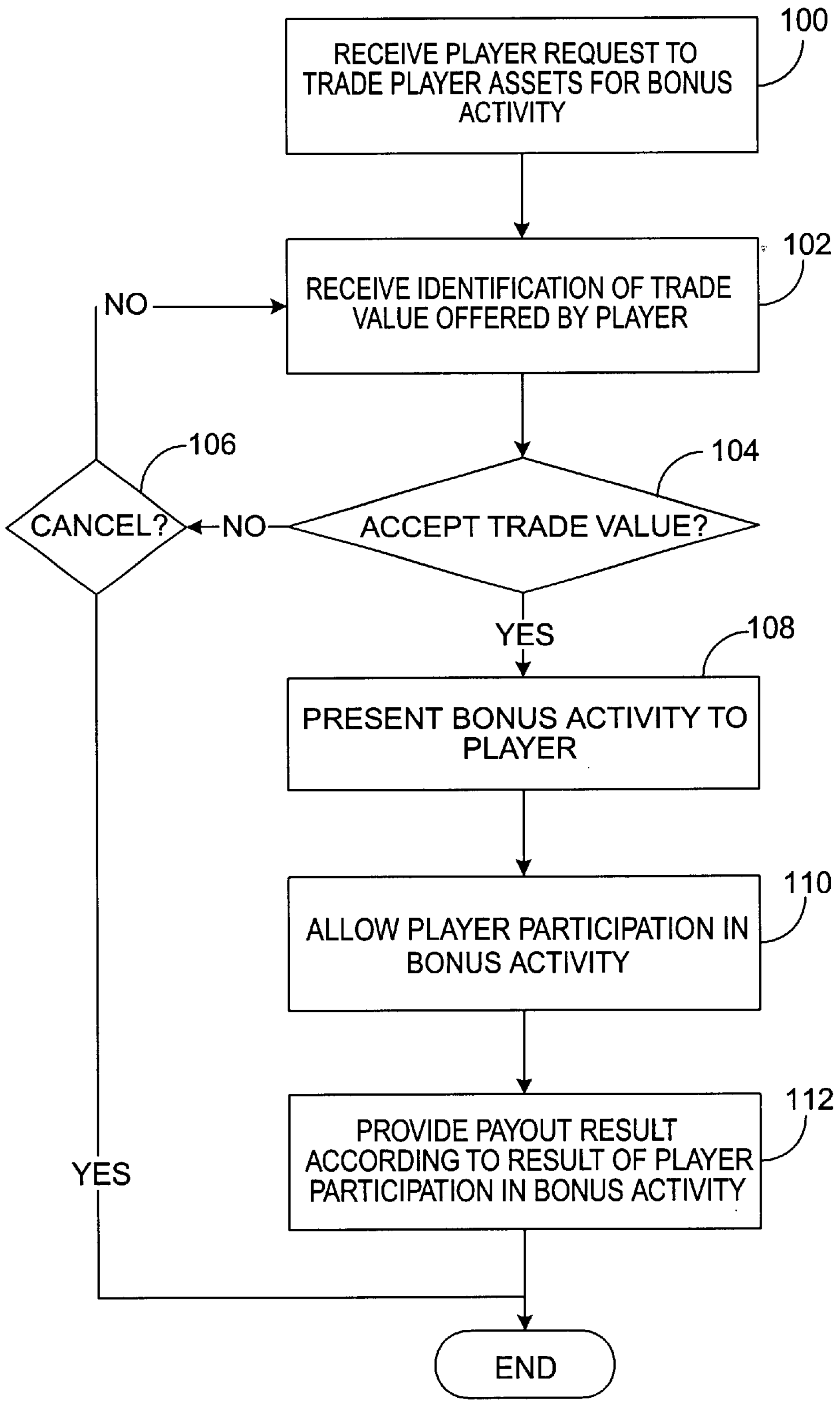
FIG. 1 is a flow diagram illustrating one embodiment of a method for facilitating trade-for-bonus gaming features in accordance with the present invention.

FIG. 1 is a diagram illustrating one embodiment of a method for facilitating trade-for-bonus gaming features in accordance with the present invention. A notification, such as a player request, is received at a gaming device such as a slot machine, as shown at block 100. The player request received is a request to trade player gaming assets for bonus activity. Player gaming assets include payouts currently won by the participant, credits accumulated by the participant, and other gaming assets capable of accumulating credits such as coins, credit, coupons, tokens, etc.

The notification to initiate the trade-for-bonus feature may be initially prompted by the system in response to an occurrence during standard gaming activity. The notification may also be originally initiated by the participant, who will know when and how a request to trade for a bonus may be carried out due to the presence of trading "rules" which may be presented or otherwise available via the gaming apparatus itself. In any case many embodiments of the present invention require that the participant take some action, whether initial action or in response to a gaming machine prompt, which may be facilitated through a user interface. For example, the user may press a button on a slot machine, touch a segment of a touch-screen, enter text, enter voice commands, or other known user entry methodology. In a more specific example, a user can press a button for "Trade," "Trade-For-Bonus," or the like on a slot machine, which readies the slot machine for play in accordance with the invention.

A gaming system in which the participant makes such a request is one that includes at least one standard gaming activity, and at least one bonus activity. For example, in the context of slot machines, a standard gaming activity includes the normal slot game in which the participant places a wager, initiates spinning the slot game reels, and collecting payouts upon the occurrence of one of a plurality of predetermined winning symbol combinations. A bonus activity is an activity different from the standard gaming activity, which generally only occurs at certain times. In other words, where the standard gaming activity is the gaming activity that is presented to the participant automatically in connection with play of the gaming device, a bonus activity is not automatically presented to the participant. Rather, the bonus activity generally is a special occurrence awarded to the participant for an occurrence resulting from standard gaming play. For example, a bonus event may be awarded to a slot game participant if a resulting symbol combination occurring during standard slot game activity corresponds to a symbol combination determined in advance to result in a bonus event award. Bonus events are typically used to attract and keep players at a gaming machine, and is typically an additional gaming reel or machine, or a random selection device, that is enabled by a bonus qualifying signal from an underlying or primary gaming activity. Generally, a predetermined combination of symbols in an underlying game may result in the player being awarded one or more bonus games. Often the bonus event has a much higher probability of winning, thereby instilling a great interest by players in being awarded bonus events. As is described more fully below, the present invention allows the participant to have a level of control pertaining to participation in bonus activities, and in some instances allows the participant to engage in bonus activity that would otherwise be unavailable to the participant through standard gaming play. In still other embodiments, the participant may simply bypass part or all of the standard gaming activity and opt to trade player gaming assets for bonus activity.

Returning to FIG. 1, an identification of a trade value offered by the player is received, in accordance with one embodiment of the invention. In this embodiment, the participant identifies an amount in which to trade for a bonus event, as seen at block 102. For example, the participant may have just won a payout during standard gaming play, and opts to trade a portion of that payout for a bonus round. In one embodiment of the invention, any part up to all of the payout may be used as the participant's "trade value." This depends on the particular embodiment in which the trading activity occurs. For example, in one embodiment of the invention, a minimum payout must be received during standard play in order to trade for a bonus event, such as a payout of sixty credits. In such an example, if the minimum required payout amount to trade is fifty credits, the participant can opt for the trade by identifying fifty credits, or may opt to use some number of credits between the minimum requirement of fifty credits and all sixty credits. The bonus round can adjust it's payout amount, or payout frequency, depending on the trade value provided by the participant. Another embodiment of the participant providing a trade value to be received 102 is where the participant decides to trade an amount of his/her accumulated credits for a bonus event. Again, there may be a minimum amount of credits that must be traded to reach a bonus event, and/or there may be different trade values that present the participant with different bonus events. For example, trading fifty credits may allow the user access to just one predetermined bonus event, but trading one hundred credits may allow the user to choose between a plurality of different bonus activities.

Other embodiments include fixed trade values. For example, the trade value offered by the player may be fixed, such that the participant need not take any explicit action, but rather the system automatically knows what the trade value is to be. Such an example would be where the participant opts to trade a payout amount for a bonus activity, yet all of the payout is automatically traded for the bonus activity. In another embodiment, the participant is allowed to choose between a plurality of bonus events, where some or all of these bonus events have the same trade value such that any one (or more) of the plurality of bonus activities may be acquired through a certain trade value (e.g., fifty credits can be traded for any one of five bonus activities—the participant is allowed to choose). This can be implemented whether or not the selectable bonus events have equivalent trade values. For example, The participant may opt to select a bonus event and trade one hundred credits, or may opt to select a different bonus event having a trade value of fifty credits and trade for either one or two of the bonus events.

In one embodiment of the invention, the gaming system has trade rules. For example, a minimum number of credits may be required to make a trade, whether the credits come from a current payout, an accumulated credit total, newly deposited monies, etc. The system determines 104 whether to accept the trade value offered by the participant. If, for example, a trade rule required that a minimum of fifty credits was required, then a determination 104 is made as to whether the trade value identified is equal or greater than the requisite fifty credits. Other trade rules may be applied and checked for compliance at decision block 104, or alternatively no trade rules may be used at all. For example, where no trade rules apply, even one credit may be traded for a bonus event, however this would require manipulation of the bonus payout amount, and/or bonus payout frequency, in order to accommodate varying trade values identified by the participant.

If the trade value is not accepted, and the user has not canceled as determined at decision block 106, a message may be provided to the participant and a new trade value may be identified by the participant for receipt 102 by the system. If the user decided to cancel, the attempt for a trade-for-bonus may simply end, thereby allowing the user to continue with standard gaming activity, cash out, etc. If the trade value is accepted, the participant is presented with a bonus activity as seen at block 108, and the participant is allowed 110 to participant in the bonus activity as a result of the trade. Payout results are then provided 112 according to the results of the player's participation in the bonus activity.

Figure 2:
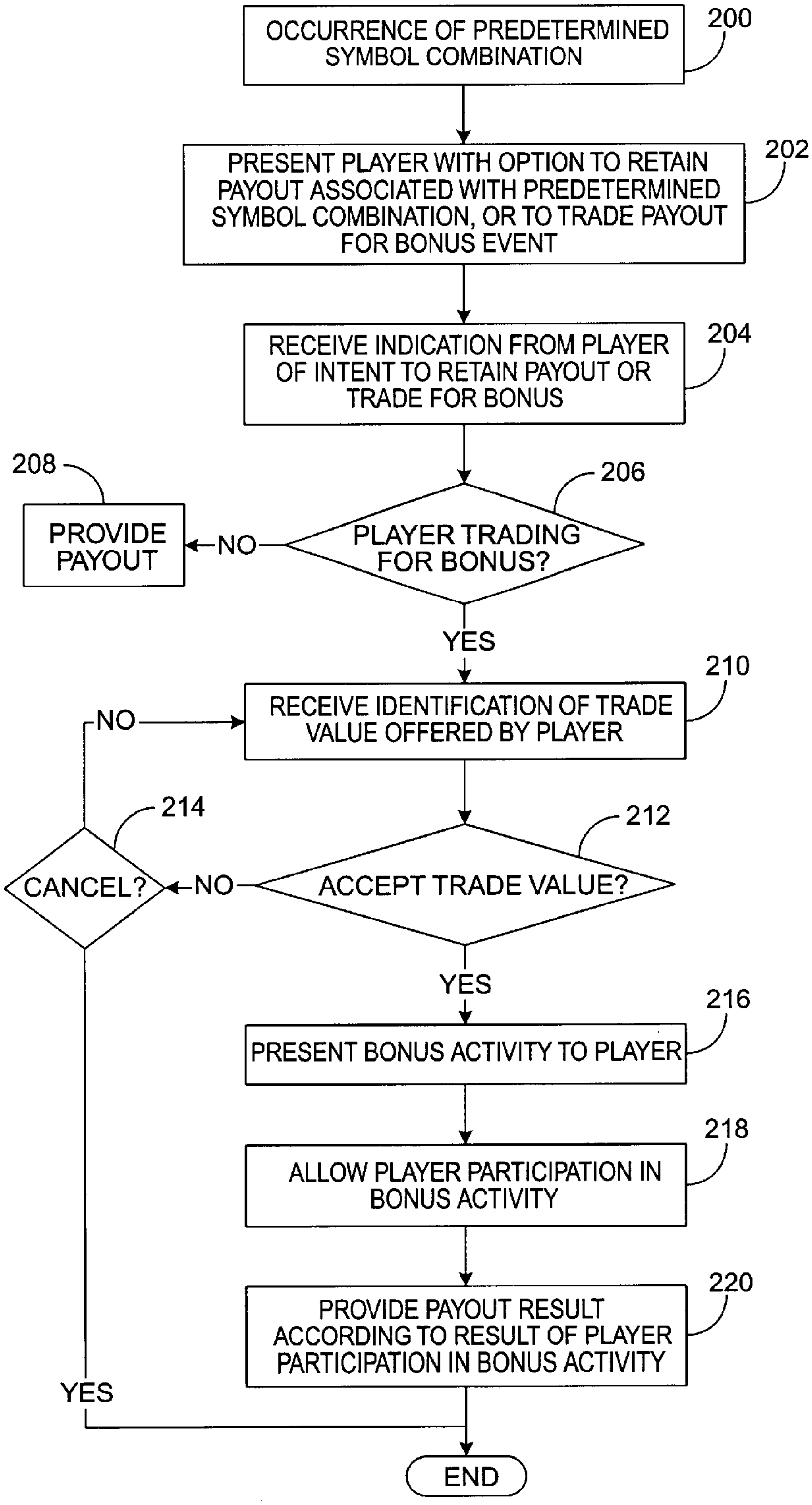
FIG. 2 is a flow diagram of an embodiment of the invention where the participant is presented with the option to trade a pending payout amount for a bonus activity.

A particularly useful embodiment of the present invention is illustrated in the flow diagram of FIG. 2. This embodiment presents a method for facilitating trade-for-bonus gaming features in accordance with the present invention as in the embodiment of FIG. 1. However, in the embodiment of FIG. 2, the participant is presented with the option to trade a pending payout amount for a bonus activity.

More particularly, one or more gaming results may be determined in advance to trigger a trade-for-bonus option. For example, in a video poker context, hands equal or greater than a predetermined result of a "straight" may be chosen to provide a trading option. In a slot machine example, any combination paying out over a predetermined amount may be chosen as the triggering event to allow trades, or alternatively any one or more particular symbol combinations may be the triggering events. For example, three oranges may provide a payout amount to the participant, but may also present the participant with the option to trade that pending payout for a bonus activity. In the example of FIG. 2, block 200 represents the occurrence of such a predetermined symbol combination, or other gaming result depending on the particular gaming activity played.

When the predetermined gaming result occurs, the player is presented 202 with an option to retain the payout associated with that predetermined gaming result, or to trade the payout for a bonus event. An indication from the participant as to whether the participant intends to retain the payout or trade for the bonus is received 204. If the participant decided not to trade for a bonus as determined at decision block 206, the standard payout is provided 208. Otherwise, a trade value offered by the participant is received 210 (or recognized as a default value). If the trade value is not accepted 212, a new trade value may be offered if the participant does not cancel 214. If the trade value is accepted 212, the participant is presented 216 with a bonus activity, and allowed to participant in the bonus activity as shown at block 218. Payout results are then provided 220 according to the results of the player's participation in the bonus activity.

Figure 3:
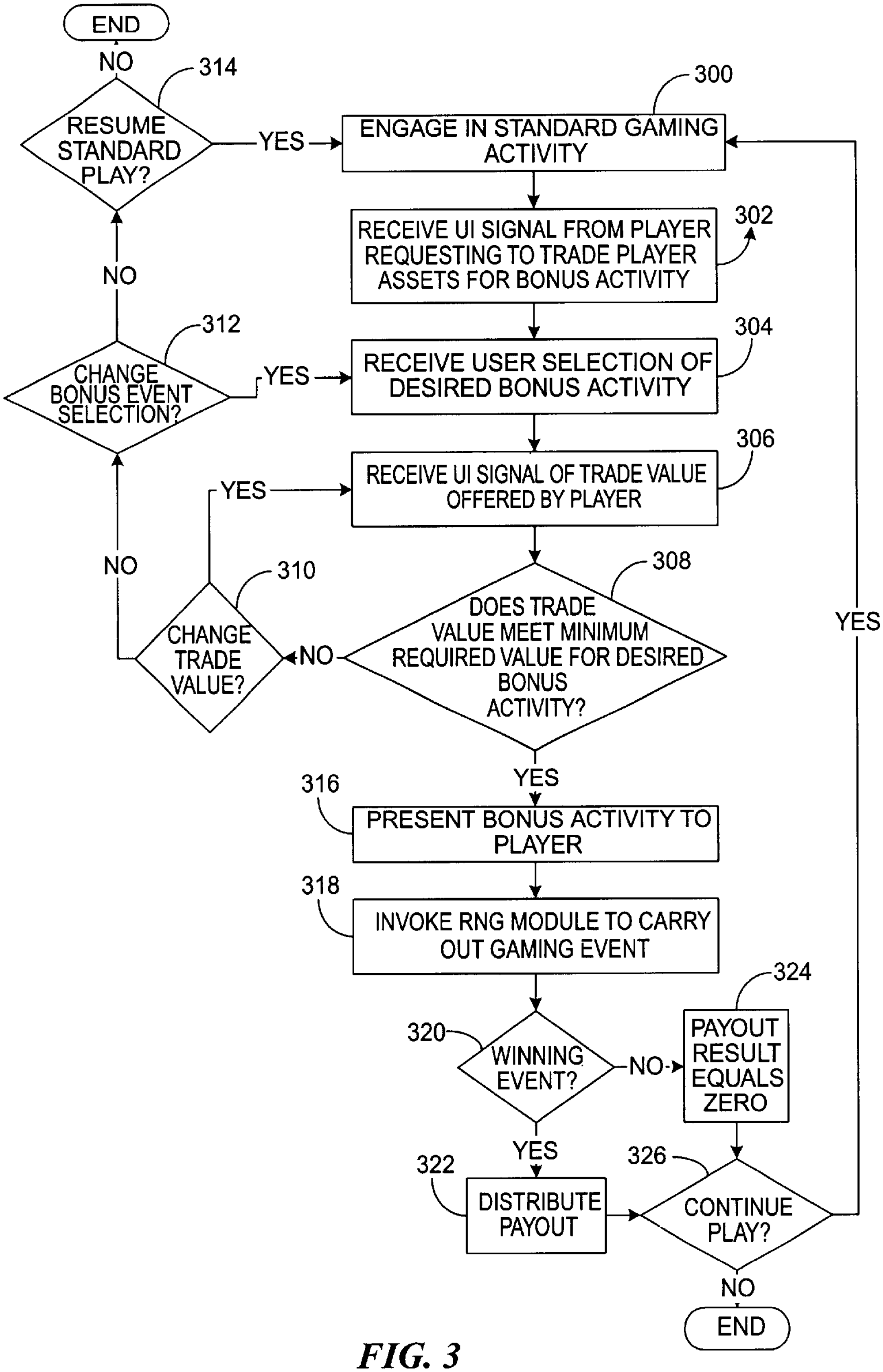
FIG. 3 illustrates a more specific embodiment of a method for facilitating trade-for-bonus gaming features in accordance with the present invention.

FIG. 3 illustrates yet another embodiment of a method for facilitating a trade-for-bonus feature in accordance with the invention. The participant engages in standard gaming activity as shown at block 300. Standard gaming activity represents the default gaming activity(s) that may be played on a gaming device. For example, a standard gaming activity on a slot machine involves placing wagers on one or more paylines, causing the mechanical or video reels to spin, and viewing results and collecting payouts based on the state of the paylines when the reels come to rest.

A signal from the participant may be received 302 via a user interface (UI), where the signal is a request to trade the participant's gaming assets for bonus activity. As earlier described, participant entry of information may be accomplished through any type of user interface, including pressing a button on a gaming machine, touching a segment of a touch-screen, entering text, entering voice commands, or other known user entry methodology.

While in one embodiment of the invention involves designating a bonus activity for play by the trading participant, other embodiments include providing the participant with options as to the bonus activity(s) to be played. In such embodiments, a user selection indication of the desired bonus activity is received 304. A trade value offered by the player may also be received 306 via a UI signal. If the trade value does not meet a minimum required value for desired bonus activity as determined at decision block 308, it is determined 310 whether the participant decided to change the trade value, and if so, a new UI signal of the trade value offered by the participant can be received 306.

The participant may also decide to change the bonus event selection, which is determined as shown at decision block 312. If it is determined that the participant has decided to change the bonus event selection, the new user selection of the desired bonus activity is received 304. If the trade value did not meet the minimum required value, and it is determined that the participant did not want to change the trade value or the bonus event selection, it is determined 314 whether the participant would like to resume standard play. If so, the participant again engages 300 in standard gaming activity. Otherwise, play ends.

Again, one embodiment of the invention involves no receipt of a signal by the participant as to the trade value. The trade value in some instances is fixed (such as X credits), or is determined through a default condition (such as defaulting to a pending payout amount). In such embodiments, no particular trade value would be offered by the participant. If the trade value meets the minimum required value for the desired bonus activity as determined at decision block 308, or if the trade value is not within the control of the participant (thereby known to the system to be an acceptable trade value), the desired bonus activity is presented 316 to the participant.

In gaming systems, a degree of chance is always a factor, requiring some sort of random selection techniques to provide fairness. In one embodiment of the invention, a random number generator (RNG) is used. RNGs are well-known in the art, and may be implemented using hardware, software operable in connection with a processor, or some combination of hardware and software. In the case of an electronic video slot machine, the random number generation (RNG) module "spins" the electronic reels in accordance with predetermined, pseudo-random, statistical probabilities. Once the bonus activity is presented to the participant, the participant can engage in the bonus activity, causing the RNG module to carry out the gaming event as depicted at block 318.

In accordance with the RNG module, it is determined 320 whether the bonus event was a winning event. If so, a payout resulting from participation in the bonus event is distributed 322, and it is determined 326 whether the participant would like to continue play. If it is not a winning event, the payout result equals zero, and it is determined 326 whether the participant would like to continue play. If continued play is desired, the participant again engages 300 in standard gaming activity. Otherwise, play ends.

Figure 4:
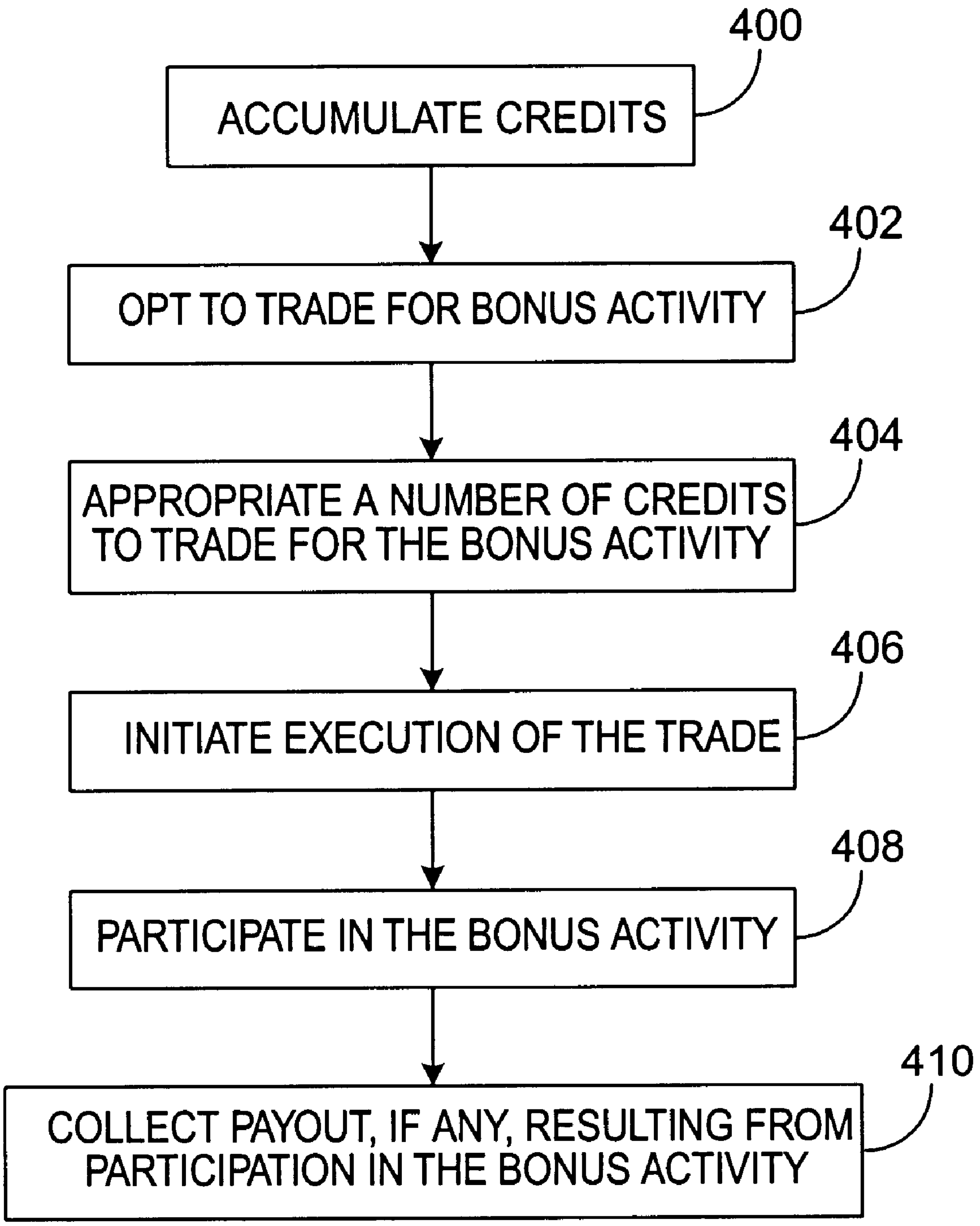
FIGS. 4 and 5 are flow diagrams illustrating embodiments of methods in which a user engages in trade-for-bonus gaming activity in accordance with the present invention.

Referring now to FIG. 4, a flow diagram is provided illustrating an embodiment of a method in which a user engages in trade-for-bonus gaming activity in accordance with the present invention. The participant accumulates credits as shown at block 400. This may involve one or any combination of accumulating credits through past or currently-pending winning payouts, adding coins, credits, coupons, tokens, etc., or other manners of accumulating credits.

The participant opts to trade participant gaming assets for bonus activity as shown at block 402, and appropriates 404 a number of credits to trade for the bonus activity. This "appropriation" of credits by the participant may be explicitly entered by the participant via a user interface, or may be a number of credits previously "agreed upon," a default value, etc. The participant may initiate 406 execution of the trade, such as by inputting a response to an option to trade for a bonus, by inputting the number of credits appropriated to the trade, by asserting a specific user interface button to initiate execution of the trade, or the like. The player is then allowed to participate 408 in the bonus activity as a result of executing a trade of player gaming assets for the bonus activity. The payout, if any, is collected 410, where the payout results from participation in the bonus activity.

Figure 5:
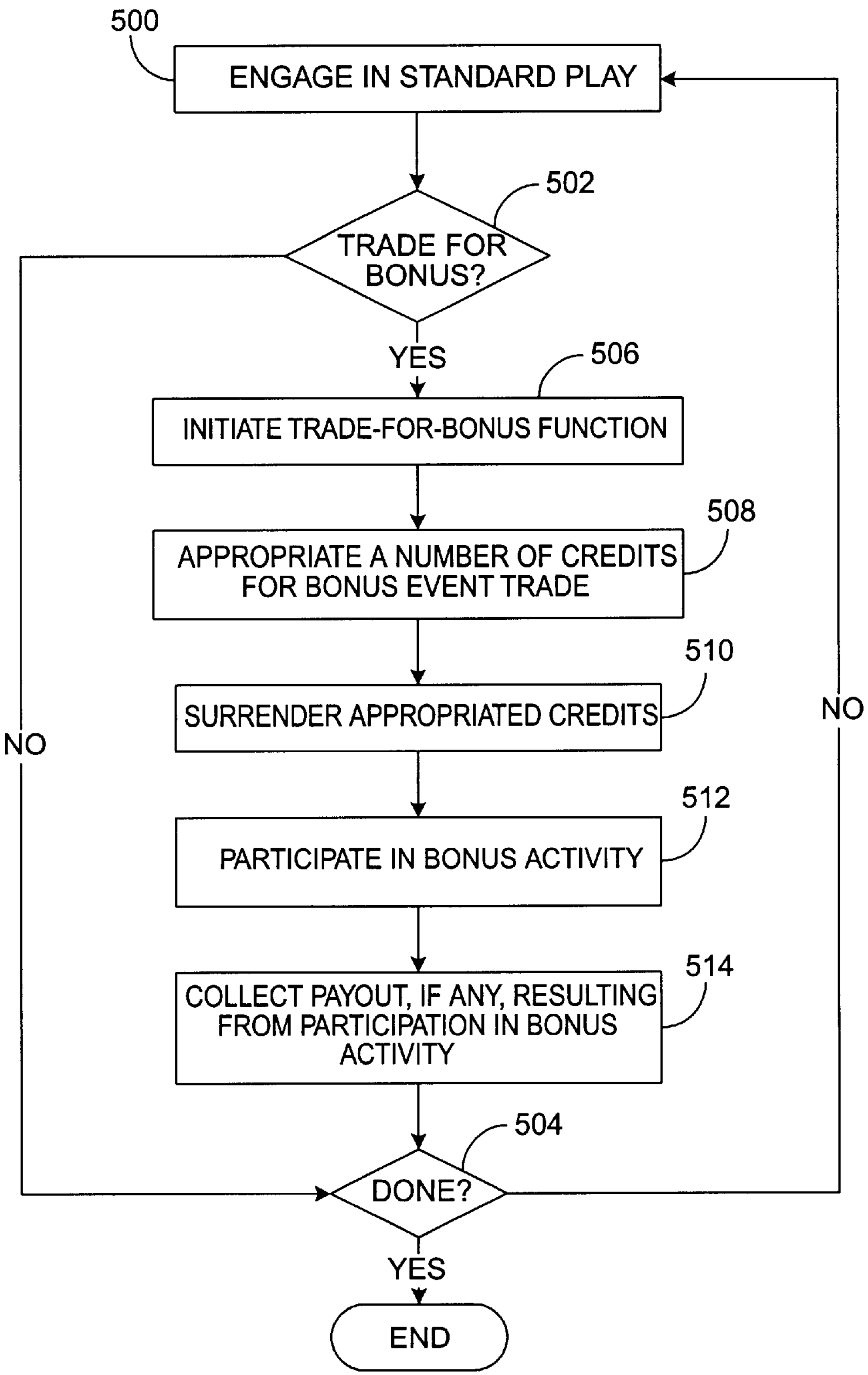

FIG. 5 is a flow diagram of another embodiment of a method in which a user engages in trade-for-bonus gaming activity in accordance with the present invention. The user engages 500 in standard play of the gaming activity. This may include slot games, video poker and other electronic card games, keno, craps, dice, roulette, etc. The present invention may be used in connection with any electronic gaming system in which a bonus event may be incorporated.

The participant decides 502 whether or not to trade for a bonus. This decision may initiated on the participant's own volition, or may be initiated by an occurrence during the standard gaming activity. In any event, the participant decides 502 whether or not to effect a trade. If not, the participant may choose 504 to end play, or alternatively may choose 504 to resume standard play as illustrated at block 500.

If the participant chooses to trade for a bonus event, the participant may initiate the trade-for-bonus function as shown at block 506. As described above, initiation of the trade-for-bonus function may alternatively be initiated by the system in response to the participant accepting an option to trade presented by the system. A number of credits for the bonus event trade may be appropriated 508. Those credits appropriated for the bonus event trade are then surrendered 510 in order for the participant to be allowed to participate 512 in the bonus activity. The payout resulting from participation in the bonus activity, if any, is collected 514 by the participant. The participant may choose 504 to discontinue further play, or to continue to engage 500 in standard play.

Figure 6:
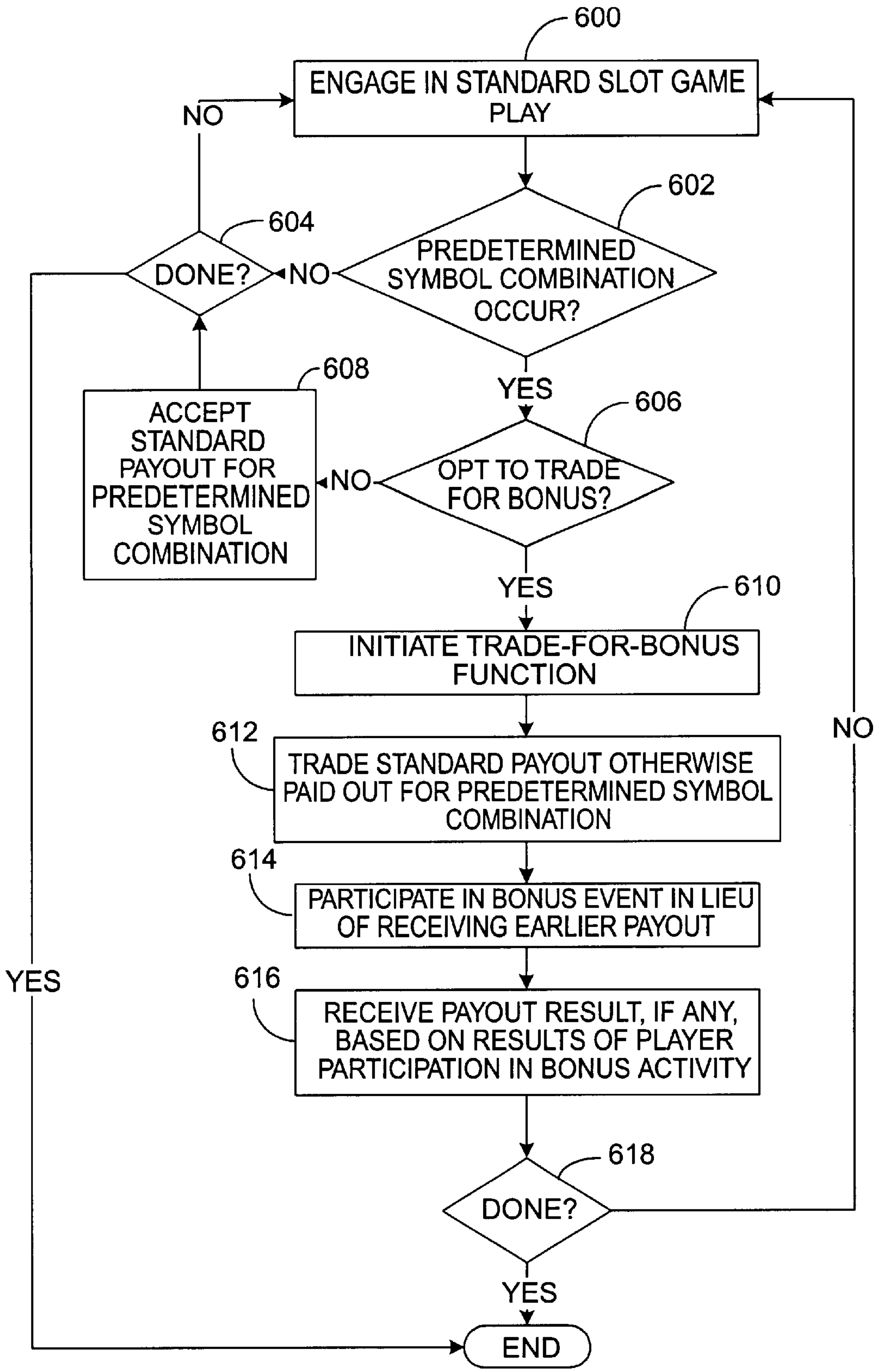
FIG. 6 is a flow diagram of an embodiment of the invention in which a user engages in trade-for-bonus gaming activity in connection with participation in a slot machine.

FIG. 6 is a flow diagram of a more particular embodiment of the invention in which a user engages in trade-for-bonus gaming activity in connection with participation in a slot machine. The user engages 600 in standard slot machine play which includes initiating spinning the slot game reels, and collecting payouts upon the occurrence of a predetermined winning symbol combination. If a predetermined symbol combination occurs as determined at decision block 602, the participant may opt 606 to trade for a bonus. If no predetermined symbol combination occurs during standard play, the participant may decide 604 to terminate play, or alternatively may continue to engage 600 in standard slot game play.

If the participant decides 606 not to trade for a bonus event, the participant accepts 608 the standard payout that applies for the particular symbol combination. In this case, the participant decided not to trade the pending payout amount from the occurrence of the symbol combination, and instead decided to take the payout provided for that symbol payout in connection with the standard slot game play. The participant can decide 604 to cease further play, or to continue to engage 600 in standard slot game play.

If the participant decides 606 to trade for a bonus event, the participant may initiate the trade-for-bonus function as shown at block 610. As described above, initiation of the trade-for-bonus function may alternatively be initiated by the system in response to the participant accepting an option to trade presented by the system. In this embodiment, the standard payout otherwise paid out as a result of the predetermined symbol combination occurring is traded 612. The participant then participates 614 in the bonus event in lieu of receiving the now-surrendered payout. The payout resulting from participation in the bonus activity, if any, is received 616 by the participant, who may then choose 618 to discontinue further play, or to continue to engage 600 in standard slot game play.

Figure 7:
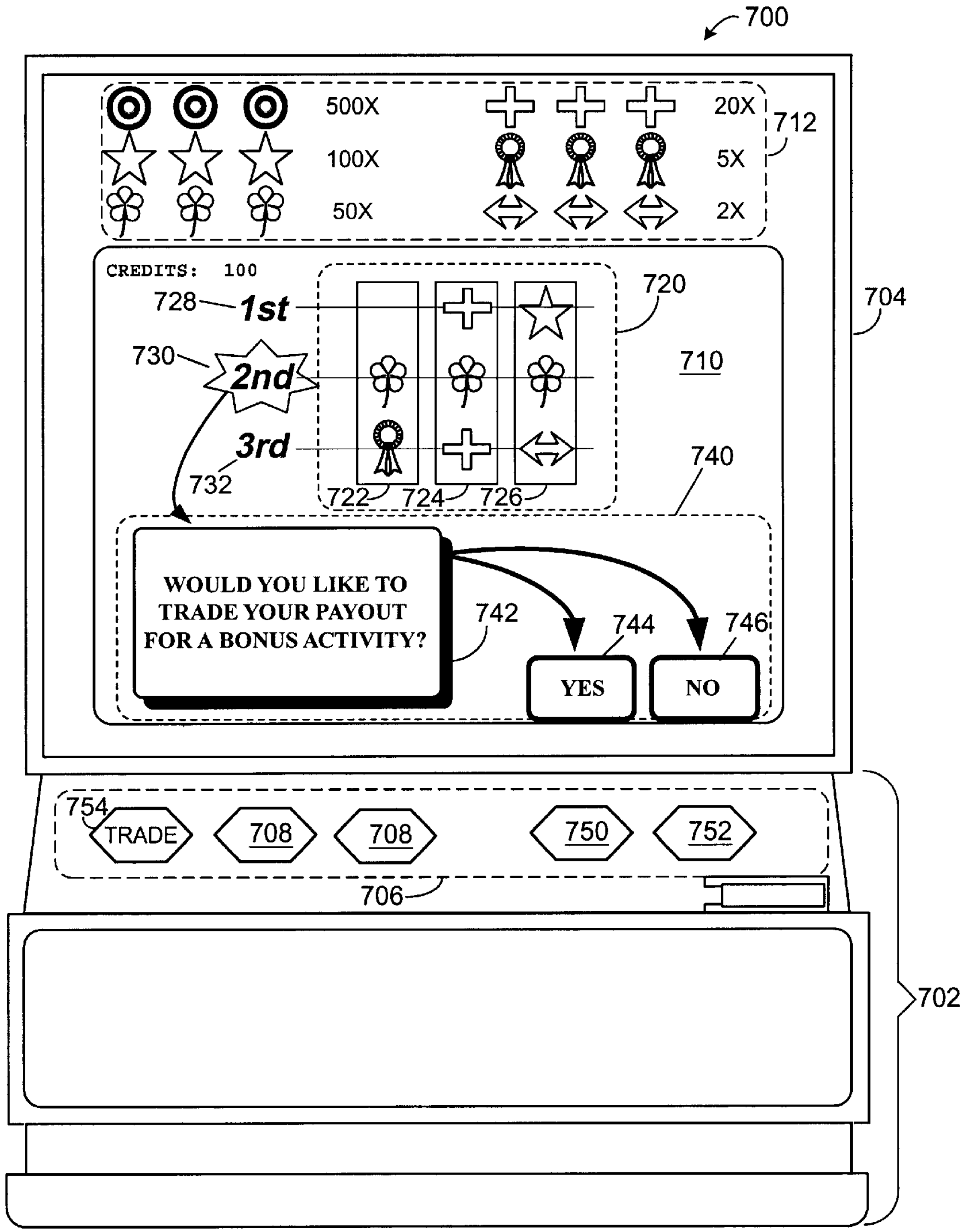
FIG. 7 is an embodiment of a casino-style gaming device in which the principles of the present invention may be applied.

FIG. 7 is an embodiment of a casino-style gaming device in which the principles of the present invention may be applied. Many traditional casino table games, such as blackjack, craps, etc. or other traditionally mechanical casino games such as roulette, may be provided in a "video game" available via a casino-style gaming device shown in FIG. 7. For purposes of explanation, the description of the gaming device is FIG. 7 is provided in terms of a slot machine 700. However, the present invention is analogously applicable to other casino-style games, such as keno, video poker, etc. Generally, any casino games having the ability to include at least one bonus activity are very well suited for use in connection with the present invention.

The slot machine 700 is a structure including at least a computing system, a housing, and a display. The housing includes a base 702 and a display device 704 to allow the example slot machine 700 to be a self-supported, independent structure. The base 702 includes structure supporting the slot machine 700, and also includes a user interface 706 to allow the user to control and engage in play of the slot machine 700. The particular user interface mechanisms associated with user interface 706 is dependent on the type of gaming machine. For example, the user interface 706 may include one or more buttons, switches, joysticks, levers, pull-down handles, trackballs, voice-activated input, or any other user input system or mechanism that allows the user to play the particular gaming activity. The user input 706 allows the user to enter coins or otherwise obtain play credits through vouchers, tokens, credit cards, etc. Various mechanisms for entering such vouchers, tokens, credit cards, coins, etc. are known in the art, and are applicable to the invention. For example, coin/token input mechanisms, card readers, credit card readers, smart card readers, punch card readers, and other mechanisms may be used to enter wagers. It is through the user input 706 that the user can initiate play, and make selections throughout play. In the case of a slot machine, the user input may include a plurality of buttons, e.g., button 708, which allow the user to enter a number of credits to play, identify the number of paylines in which to participate, cash out, automatically bet the maximum amount and paylines, etc. The buttons 708, or other user interface, can also allow the user to make other control decisions, such as engaging in the trade-for-bonus feature of the invention, entering the trade values (e.g., credits) to be applied to the trade, as well as many others.

The user input 706 also allows the user to make selections and identifications in accordance with the invention. The user interface 706 may be used to select bonus options (see, e.g., block 304 of FIG. 3), such as the particular one of a plurality of bonus activities will be played. The particular user input chosen to facilitate the operations and functions of the present invention may change depending on preferences of the gaming device designer. Further, a wide variety of user input configurations and mechanisms are known in the art which may be used in connection with the present invention.

The display device 704 includes a display screen 710. The display device may take on a variety of forms depending on what type presentation is to be provided. For example, a slot game area 720 is provided where the standard slot gaming activity is displayed. In this example, the standard slot gaming activity includes three video reels 722, 724, 726, and three paylines depicted as the $1^{st}$ payline 728, the $2^{nd}$ payline 730, and the $3^{rd}$ payline 732. Another presentation that may be displayed on the display screen 710 is a trade information and selection area 740. In the present example, the trade information and selection area 740 includes a trade prompt window 742 that prompts the user to make a decision as to whether or not to trade a payout for a bonus activity. Other indicia may also be presented in the trade information and selection area 740, including selection indicia 744 and 746. Selection of the "YES" indicia 744 would provide an indication of the participant's desire to trade the pending payout on the $2^{nd}$ payline 730 for a bonus event. Selection of the "NO" indicia 746 would indicate that the participant has decided to keep the payout (e.g., 50X) on the $2^{nd}$ payline 730, and forego any opportunity to trade the payout for a bonus event.

Where the trade information and selection area 740 includes selection indicia such as indicia 744 and 746, selection is made depending on the particular type of user interface employed. For example if the display screen 710 employs touch screen technology, touching the displayed indicia 744 or 746 will select the corresponding option. Alternatively, buttons such as buttons 750, 752 on the user input 706 interface may correspond to the indicia 744, 746 respectively. For example, notwithstanding the possibility that buttons 750, 752 correspond to different functionalities when the indicia 744, 746 are not displayed, the presentation of indicia 744, 746 causes buttons 750, 752 to take on the function of selecting its corresponding indicia 744, 746. For example, pressing button 750 when indicia 744 is presented will provide an indication that the participant would like to trade the pending payout for a bonus activity.

In yet another embodiment, the participant may press the "trade" button 754 on the user input 706. Activation of such a button may initiate a trade by the participant, whether or not a payout is pending or not. For example, in the embodiment where a participant decides to trade a number of previously accumulated credits for one or more bonus events, the participant can press the trade button 754 to initiate such activity. As will be readily apparent to those skilled in the art from the description provided herein, other trade alternatives and corresponding user interface options are within the scope of the invention.

Also associated with the display device 704 is an optional winning guide area 712, where information associated with the potential winning symbol combinations of the standard slot game activity may be presented. Optionally, the potential winning formulas and symbols associated with winning bonus activities may also be presented in the winning guide area 712. This information may be part of the display screen 710, or alternatively may be separate from the display screen 710 and provided directly on a portion of the display device 704 structure itself. For example, a backlit colored panel may be used as the winning guide area 712.

Figure 8:
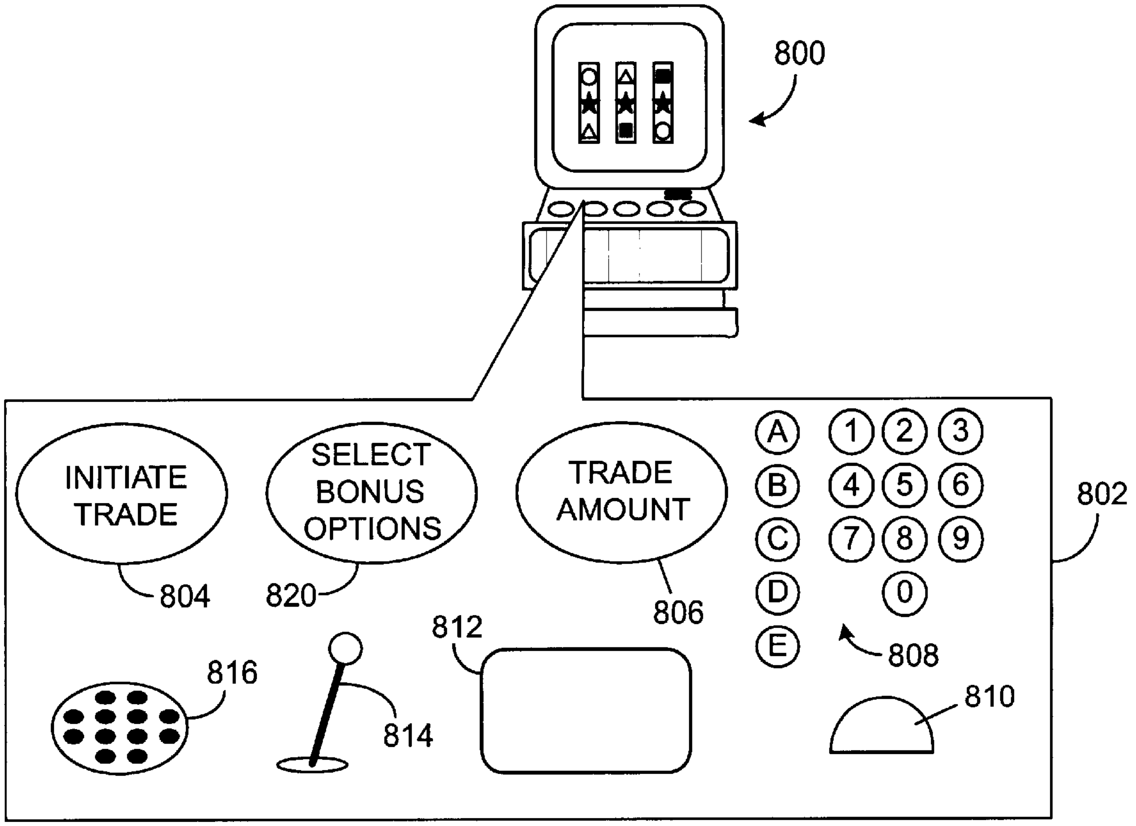
FIG. 8 is a block diagram illustrating user interface embodiments in which the user can accomplish the trade-for-bonus features in accordance with the present invention.

FIG. 8 is a block diagram illustrating embodiments in which the user can effect the trade-for-bonus features in accordance with the present invention. The user of slot machine 800 uses a user input interface such as input interface 802. The user may press the initiate trade button 804 to notify the system that the participant would like to trade player gaming assets for one or more bonus events. The user may, in one embodiment, then press the trade amount button 806 to indicate the desired number of credits to be applied to the trade. The number of credits may be entered in a variety of ways, including keypad 808, trackball 810, touch screen 812, joystick control 814, audio command input via microphone 816, etc. Further, the user may activate the select one or more bonus option buttons 820, and perhaps in connection with one or more other user interface mechanisms shown in FIG. 8, to make selections regarding trade-for-bonus options.

It should be recognized that any type of user interface may be used in connection with the present invention, and the invention is not limited to any particular type of user interface. For example, the functions associated with a few UI buttons may change, and the function associated with a particular button at a particular time may be displayed on a portion of the display device proximate the UI button. In this manner, fewer UI buttons would be required, as the computer and display essentially modify the operation associated with the UI buttons. A wide variety of other user interface options are also available for use in connection with the present invention.

Figure 9:
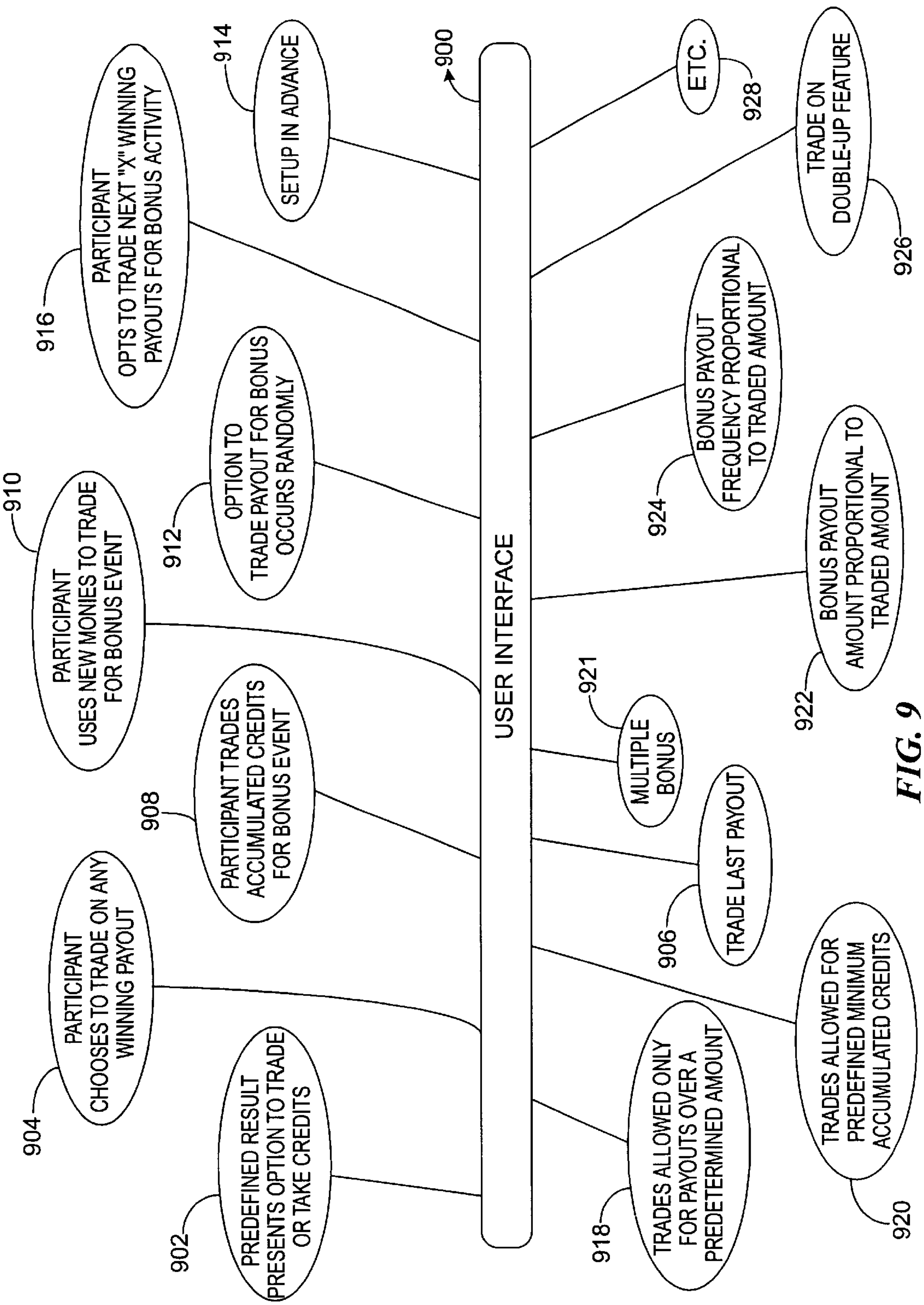
FIG. 9 is an illustration representing a variety of options available in connection with the trade-for-bonus feature of the present invention.

Regardless of the particular user interface mechanism employed, the present invention is applicable in connection with a wide variety of trade options. Some of these options are presented in FIG. 9 for purposes of example. It should be recognized that the various options presented in FIG. 9 are presented to facilitate an understanding of the invention, and the invention is capable of numerous different trade options. Therefore, the examples provided in FIG. 9 are not to be limiting to the scope of the invention, but rather serve to illustrate the types of options that can be used in connection with the invention.

Referring now to FIG. 9, a user interface 900 is represented. The user interface 900 may be any type of user interface, including those described herein. Through the user interface 900 a variety of options may be employed in connection with the invention. The system may be configured to require a general initiation of an option, or alternatively may require additional user input. For example, many options may be initiated through the user interface simply by having the user request a trade (whether prompted or not), and the remaining actions are configured into the system to occur automatically. Other embodiments may involve additional entries by the user. Various exemplary embodiments are set forth and described in greater detail below.

Option 902 represents those embodiments wherein the user interface 900 presents an option to trade a pending payout for a bonus event, and allows the participant to make such a selection. For example, in a slot game embodiment, the occurrence of a winning symbol combination may present an option to the participant to trade that currently-pending payout for a bonus. The participant can decide to make the trade, or decide to take the credits.

Another option 904 represents embodiments where the participant chooses to trade on any winning payout. For example, rather than the system prompting the participant upon the occurrence of a predetermined symbol combination, the participant can initiate a trade of a pending payout for bonus activity upon the occurrence of any winning payout. For instance, the participant may win numerous times in a row and simply continue standard play, or may alternatively decide on any one or more of those winning combinations to effect a trade. Option 906 is similar to option 904, however, option 906 allows the participant to trade the last payout amount. This option might be beneficial in an embodiment where, for example, a payout is automatically awarded to a participant who obtains a winning symbol combination during standard play. Option 906 allows the participant to give back the payout amount as a trade for bonus activity.

In one embodiment, the participant trades previously accumulated credits for bonus events, as shown at option 908. For example, if over time the participant has accumulated one hundred credits through initial monetary input and accumulated winnings, a portion of these winnings can then be allocated for a trade, and surrendered to obtain bonus event activity in return. In an analogous embodiment, the participant may use new monies to trade for bonus events, as shown at option 910. For example, the user may input coins, tokens, coupons, and the like to accumulate a number of credits which can then be traded for bonus activity, thereby essentially bypassing the standard play of the gaming device altogether.

Option 912 relates to an embodiment where the selectable option presented to the participant to trade a pending payout for bonus activity occurs randomly. For example, in the context of slot games, the participant is randomly provided with the option of trading a pending payout for a bonus. The participant would then know that he/she will get opportunities to trade for bonus events when obtaining winning symbol combinations through standard slot game play, but will not know when since it is random. In another embodiment, the participant may be presented with the option to trade every $n^{th}$ time the participant receives a winning symbol combination through standard play.

Another embodiment contemplates advance setup of trade-for-bonus options. Such an embodiment is illustrated by option 914. In this manner, a participant may select trade-for-bonus options prior to actually being in a position to execute a trade. For example, the participant may choose in advance to have the gaming device prompt the participant each time a trade-for-bonus event arises. Alternatively, the participant may choose in advance to never have the gaming device prompt the participant, but rather the participant will explicitly activate the trade function if and when he/she wants to utilize this feature. Option 916 is one example of a previous-configured trade-for-bonus selection, where the participant opts to trade the next "X" winning payouts for bonus activity. With this option, the participant could choose to trade the next five winning payouts for bonus activity, and this would then occur automatically for the next five winning payouts.

Other embodiments allow trade activity only when certain criteria, i.e., trade acceptance rules, are met. For example, option 918 allows trades only for standard play payouts that are at least a predetermined minimum amount. For example, a trade could be available only for payouts of thirty credits or more. In an analogous embodiment represented by option 920, trades are allowed only when the participant has accumulated at least a minimum number of credits, whether accumulated through a current winning payout, an accumulated credit total, or a combination thereof. For example, a minimum credit accumulation of one hundred credits may be required, and if the participant has accumulated eighty credits, and had a currently-pending winning symbol combination paying twenty credits, then the participant may make the trade for the bonus activity. In another similar embodiment, the trade could automatically occur when a predetermined number of credits has been accumulated, and the participant has at some time authorized the trade to occur.

Option 921, illustrated as the multiple bonus option, represents embodiments where a plurality of bonus rounds may be acquired by the participant. For example, if a particular bonus has a trade value of one hundred credits, and the participant just won five hundred credits (or accumulated five hundred credits as the case may be), the participant could choose to trade for up to five of those bonus rounds. Alternatively, the participant could choose to trade for a lesser number of bonus rounds, and retain the remaining number of credits. For example, rather than trading all five hundred credits for the bonus rounds, the participant could choose to trade for participation in a lesser number of the bonus rounds, such as three of the bonus rounds, thus costing the participant three hundred of the acquired credits and allowing the participant to keep the remaining two hundred credits.

Option 922 represents an embodiment where the bonus payout amount is proportional to the amount traded. For example, if the participant opted to trade accumulated credits or a pending payout of ten credits, the bonus payout would be less than had the participant traded thirty credits. In another embodiment represented by option 924, the bonus payout frequency is proportional to the amount traded. For example, if the participant opted to trade accumulated credits or a pending payout of ten credits, the bonus payout would occur less frequently than had the participant traded thirty credits. Some combination of options 922 and 924 may also be implemented.

Option 926 represents an embodiment where a participant trades for a bonus out of a double-up feature. Double-up features are known in the art, and generally refer to increasing the bet by a like amount. In connection with one embodiment of the invention, a number of credits accumulated through a double-up can then be traded for a bonus activity in accordance with the present invention.

As can be seen, there are a wide variety of alternative options that can be utilized in connection with the present invention, as represented by option 928. In each instance, however, a number of credits are traded for the ability to engage in a bonus round that might otherwise be unavailable. For example, in one embodiment of the invention, bonus events are automatically provided to participants upon the occurrence of certain gaming results (e.g., symbol combinations in slot games), but those same bonus events may become available to the participants through trades for bonus events as described herein. In this manner, a participant may reach the bonus activity earlier, or when it would be otherwise unavailable.

It should be recognized that it is generally the case that those deciding to make a trade for bonus activity will have the ability to increase their winnings through the bonus round. In one embodiment, the participant may risk all of the traded amount when engaging in the bonus activity, with the chance (for example) of making a large amount relative to the initial trade value. In another embodiment, the bonus activity may be set such that the participant is guaranteed some return payout from the bonus activity, although it may be less than the originally-traded amount. Again, the participant would hope to win a greater amount through the bonus round, not to mention that the participant may enjoy the variation provided by the bonus round activity. In another embodiment, the traded-for bonus round may be set such that the participant will not lose the traded investment. Instead, the participant is guaranteed return of at least the amount used in the trade, however the payout may be a lesser amount than if the participant was not guaranteed the return, and/or the payout for higher amounts may be set such that they occur less frequently than if the participant was not guaranteed the return. These decisions may be made based on the statistical analysis typically used to set payout frequencies and amounts on gaming machines.

It should further be noted that the inclusion of a trade-for-bonus (or alternatively a feature allowing an earned bonus to be traded for a more traditional gaming payout) may affect the payout schedule due to statistical changes resulting from such features. For example, many casino games are set to provide an approximate percentage payout, which is predetermined in advance. In one embodiment of the invention, the probabilities and corresponding payouts associated with trade feature of the present invention may be included in the initial statistical analysis, such that the participant is eligible for the trade features regardless of the number of coins, credits, coupons, tokens, etc. played. In accordance with another embodiment of the invention, an additional "payment" may be required by the participant to make the participant eligible for the trade feature of the present invention. For example, the participant may allocate one coin/credit to play one payline on a slot machine, two coins/credits to play two paylines, and three coins/credits to play three paylines. In order to be eligible for the trade feature of the present invention, the participant could, in such an embodiment, be required to allocate a fourth coin/credit to activate the trade feature. In a more particular example, if the participant entered only three coins/credits and the participant hit a symbol combination that would otherwise be available to trade (e.g., three plums), then the participant would receive the payout only and would not be offered to trade the payout. On the other hand, had the participant entered the fourth coin/credit (or other predetermined amount/action) that makes the participant eligible for the trade feature, hitting the same symbol combination (e.g., three plums) would give the participant the option of taking the payout, or trading the payout for one or more bonus events. As can be seen from the foregoing description and examples, a gaming asset allocation may, in some embodiments, be required in order to make the participant eligible for the trade feature of the present invention. Further, any number of different manners of making such eligibility payments may be used in accordance with the invention. For example, payment of an addition coin, credit, token, etc. (i.e., some gaming asset) for each payline or predetermined number of paylines; payment of additional gaming assets for each predetermined number of games played (e.g., for each ten paylines played, whether or not played one, two, three, etc. paylines at a time), or any other manner of allocating credits and/or paying additional gaming assets may be used in connection with such an embodiment.

Figure 10:
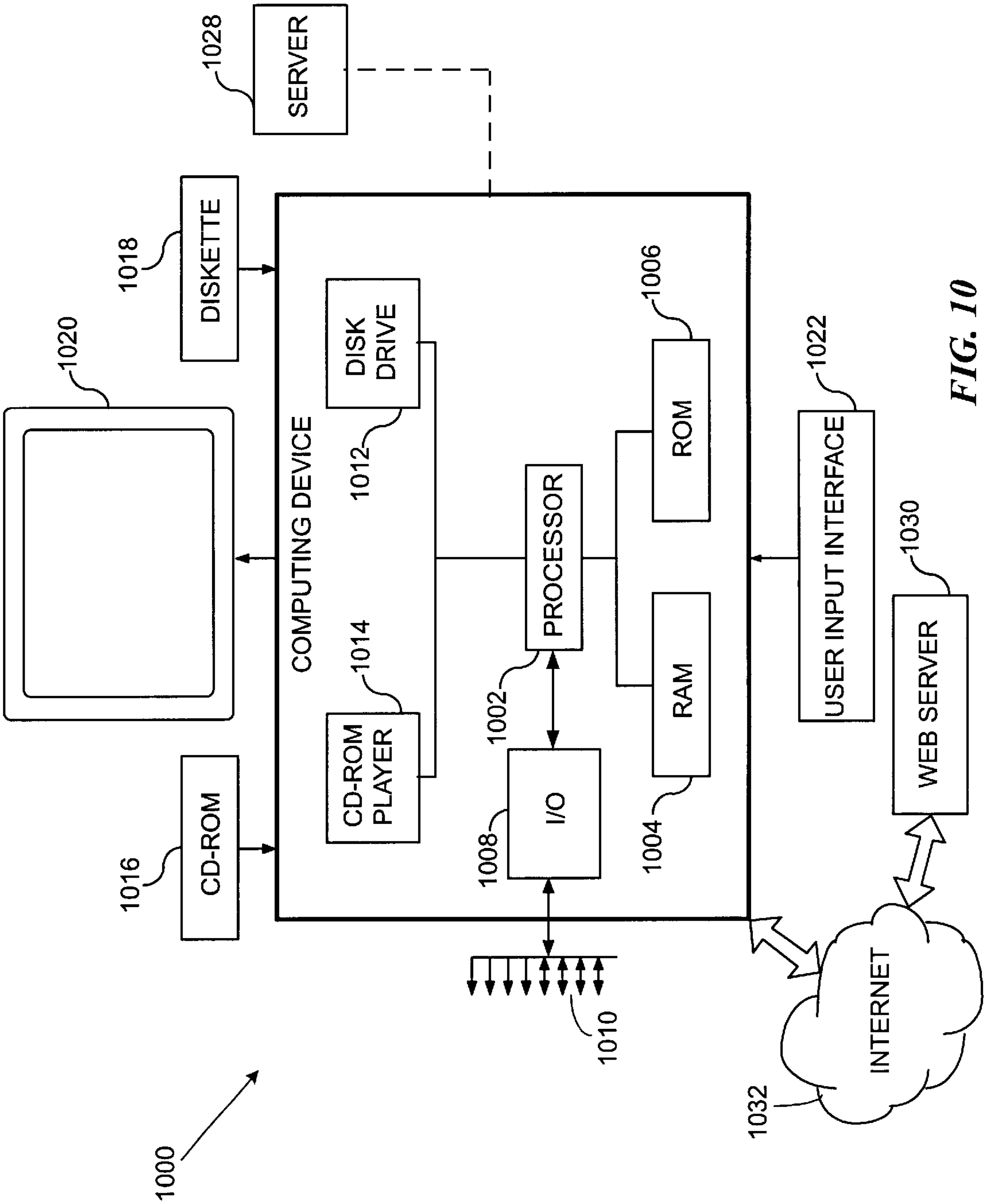
FIG. 10 is a block diagram of an example computing structure that can be used in connection with electronic gaming machines, computers, or other computer-implemented devices to carry out operations of the present invention.

The gaming machines described in connection with the present invention may be independent casino gaming machines, such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with the invention is illustrated in FIG. 10.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 1000 of FIG. 10 is an example computing structure that can be used in connection with such electronic gaming machines, computers, or other computer-implemented devices to carry out operations of the present invention.

The example computing arrangement 1000 suitable for performing the gaming and trade-for-bonus functions in accordance with the present invention typically includes a central processor (CPU) 1002 coupled to random access memory (RAM) 1004 and read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. The processor 1002 carries out a variety of functions as is known in the art, such as addition, subtraction, comparisons, etc. as dictated by software and/or firmware instructions. For example, the processor 1002 may include an arithmetic execution module, such as an arithmetic logic unit (ALU), to perform a subtraction function such as would be required to subtract a traded credit amount from a participant's credit accumulation.

Chance-based gaming systems such as slot machines, in which the present invention is applicable, are governed by random numbers and processors. Electronic reels are used to display the result of the digital reels which are actually stored in computer memory and "spun" by a random number generator (RNG). RNGs are well-known in the art, and may be implemented using hardware, software operable in connection with the processor 1002, or some combination of hardware and software. In accordance with generally known technology in the field of slot machines, the processor 1002 associated with the slot machine, under appropriate program instruction, can simulate the vertical rotation of multiple reels. Generally, the RNG continuously cycles through numbers, even when the machine is not being played. The slot machine selects, for example, three random numbers. The numbers chosen at the moment the play is initiated are typically the numbers used to determine the final outcome, i.e., the outcome is settled the moment the reels are spun. The resulting random numbers are generally divided by a fixed number. This fixed number is often thirty-two, but for slot machines with large progressive jackpots it may be even greater. After dividing, the remainders will be retained. For example, if the divisor was one-hundred twenty-eight, the machine would have three remainders ranging from zero to one-hundred twenty-seven. The remainders may be considered as stops on virtual reels. If the divisor was one-hundred twenty-eight, then the virtual reels would each have one-hundred twenty-eight stops with each stop being equally likely. Each stop on the virtual reel may be mapped to a stop on an actual reel or displayed reel image. These reel images may then be displayed on the display 1020. The present invention is operable using any known RNG, and because RNGs are well known in the art, no further description need be provided herein.

The computing arrangement 1000 may also include one or more data storage devices, including hard and floppy disk drives 1012, CD-ROM drives 1014, and other hardware capable of reading and/or storing information such as DVD, etc. In one embodiment, software for carrying out the gaming and aggregate play operations in accordance with the present invention may be stored and distributed on a CD-ROM 1016, diskette 1018 or other form of media capable of portably storing information. These storage media may be inserted into, and read by, devices such as the CD-ROM drive 1014, the disk drive 1012, etc. The software may also be transmitted to the computing arrangement 1000 via data signals, such as being downloaded electronically via a network, such as the Internet. The computing arrangement 1000 is coupled to a display 1020, which represents a display on which the one or more gaming activity and aggregate play activities are presented. The display 1020 merely represents the "presentation" of the video information in accordance with the invention, and may be any type of known display or presentation screen, such as LCD displays, plasma display, cathode ray tubes (CRT), etc. Where the computing device 1000 represents a stand-alone or networked computer, the display 1020 may represent a standard computer terminal or display capable of displaying multiple windows, frames, etc. Where the computing device is embedded within an electronic gaming machine, such as slot machine 700 of FIG. 7, the display 1020 corresponds to the display screen 710 of FIG. 7. A user input interface 1022 such as a mouse or keyboard may be provided where the computing device 1000 is associated with a standard computer. An embodiment of a user input interface 1022 is illustrated in connection with an electronic gaming machine 700 of FIG. 7 as the various "buttons" 708. Other user input interface devices include a keyboard, a mouse, a microphone, a touch pad, a touch screen, voice-recognition system, etc.

The computing arrangement 1000 may be connected to other computing devices, such as on a network. The computing arrangement 1000 may be connected to a network server 1028 in an intranet or local network configuration. The computer may further be part of a larger network configuration as in a global area network (GAN) such as the Internet. In such a case, the computer accesses one or more web servers 1030 via the Internet 1032.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

One skilled in the art of computer science from the description provided herein will be able to combine the software created as described with appropriate general purpose or special purpose computer hardware to create a computer system and/or computer subcomponents embodying the invention, and to create a computer system and/or computer subcomponents for carrying out methods of the invention.

The present invention is also capable of effecting trades of bonus events for a more traditional payout. For example, a participant may receive an opportunity to participate in a bonus activity, but choose to settle for a known payout instead. A participant may want to make such a trade in order to avoid the chance of winning nothing (or a relatively small payout) through participation in the bonus event, although the known payout may be significantly less than a maximum payout available through participation in the bonus event.

Figure 11:
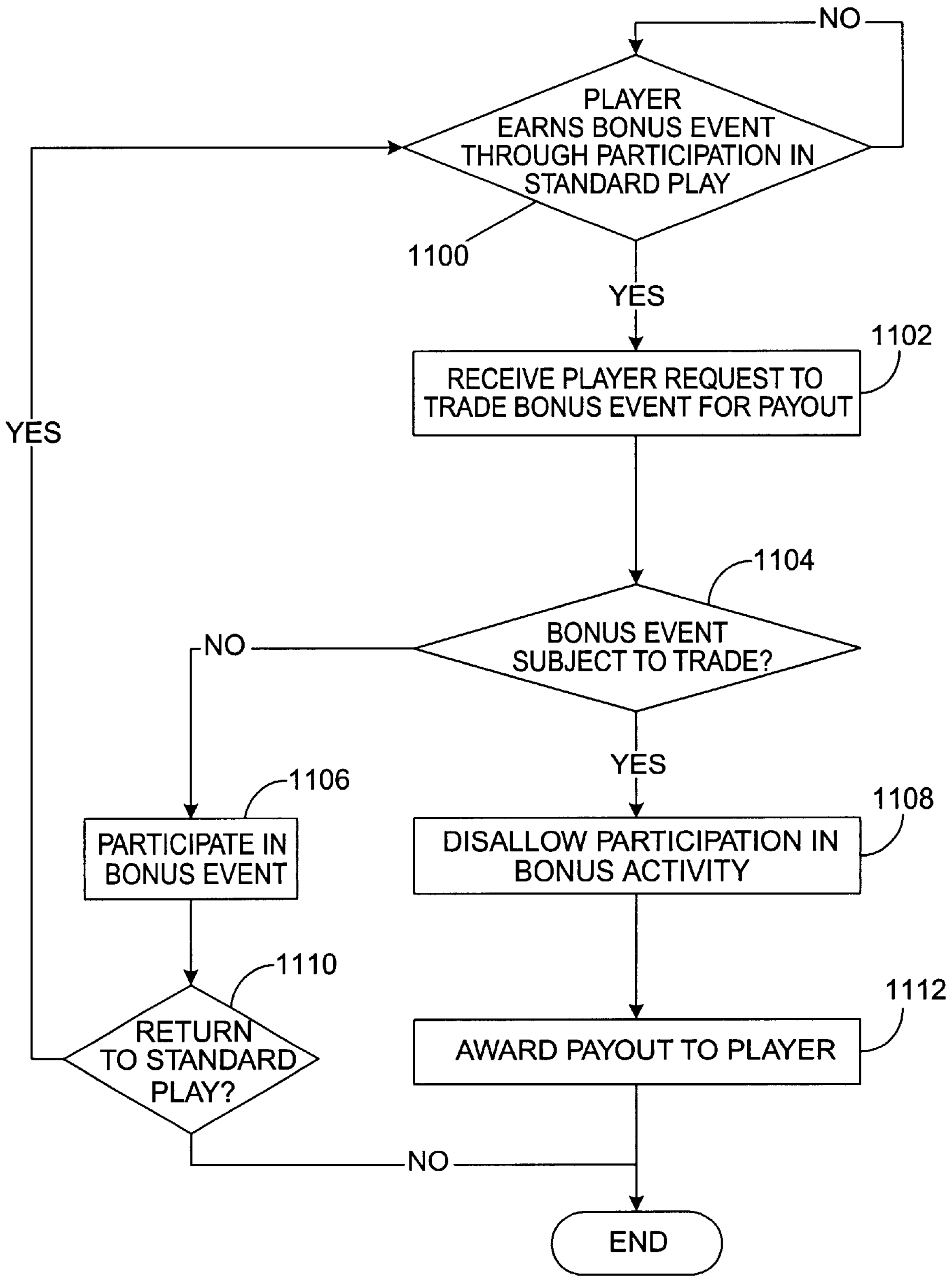
FIG. 11 is a flow diagram illustrating one embodiment of a method in which a bonus event may be traded for a known payout amount.

FIG. 11 is a flow diagram illustrating one embodiment of a method in which a bonus event may be traded for a known payout amount. A player engaged in standard play of a gaming activity may earn a bonus event, as seen at decision block 1100. For example, a player participating in a slot game on a slot machine may be engaged in standard slot play, and may hit a predetermined symbol combination that presents the user with a bonus event. If the player earns a bonus event, a player request is received 1102 at the gaming device to trade the bonus event for a known payout. The player request may be initiated by the player, or alternatively may be provided by the player in response to an invitation provided via the gaming device.

A player may choose to trade a bonus event for a known payout, as a conservative move to ensure at least some tangible payout. Bonus events, while generally made to provide heightened entertainment and/or a greater chance of larger payouts, still may result in no payout. The option of FIG. 11 allows a participant to take a known amount rather than risk it, even though it might be statistically beneficial to participate in the bonus event. The "known" amount may be calculated in any desired fashion, and will generally be calculated such that the desired payout percentage of the machine is maintained. For example, where the payout corresponding to the relinquished bonus event ranges from two credits to five hundred credits, and is weighted such that an average payout for bonus event participation is forty credits, the known value may be selected at this average or below this average (e.g., twenty-five credits).

Optionally, some bonus events may not be subject to trade, as determined at decision block 1104. If not, the participant will participate 1106 in the bonus event, and can decide 1110 whether or not to thereafter return to standard play. If the bonus event is available for trade, the trade is executed by disallowing participation in the bonus activity as shown at block 1108, and awarding the known payout to the player as shown at block 1112. Thus, if the player decides to trade an earned bonus event for a known amount, execution of that trade results in a payout being made to the player instead of having the player participate in the bonus event.

It should be recognized that the payout received by the player need not be a "known" value to the player, but instead could be a random value. In such an instance, the player would be foregoing participation in the bonus round for a chance of winning a yet-to-be-known payout amount.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, the present invention is not limited to what is traditionally known as "slot machines." The present invention is applicable to any gaming device to incorporate bonus rounds in connection with a gaming system. Also, while the illustrated embodiments have been described in large part in connection with a "slot machine," other gaming systems and concepts are also within the scope of the invention, such as video poker games, card games, lotteries, and other casino events implementing a video screen. It is thus intended that the scope of the invention be limited not with this detailed description, but rather by the claims appended hereto.

What is claimed is:

1. A method for facilitating participation in gaming activity events which include at least one gaming activity and at least one bonus activity, comprising:

receiving an indication to trade player assets for at least one bonus activity;

receiving an identification of a trade value offered by the player, wherein the trade value comprises at least a portion of the player assets;

executing the trade by accepting the trade value offered by the player, and in response presenting the bonus activity to the player when otherwise unavailable in connection with the gaming activity;

allowing player participation in the bonus activity; and providing a payout result corresponding to a result of the player participation in the bonus activity.

2. The method as in claim 1, wherein receiving an indication to trade player assets comprises receiving a player request initiated by the player.

3. The method as in claim 2, wherein receiving a player request initiated by the player comprises receiving a player request initiated by the player in response to a predetermined occurrence of the gaming activity event.

4. The method as in claim 2, wherein receiving a player request initiated by the player comprises receiving an unsolicited request by the player to trade player assets for bonus activity.

5. The method as in claim 1, wherein receiving an indication to trade player assets comprises receiving an automatic request initiated via the gaming activity event upon an occurrence of one or more predetermined events.

6. The method as in claim 1, further comprising presenting a selectable option to trade player assets for bonus activity, and wherein receiving an indication to trade player assets comprises receiving an option selected by the player.

7. The method as in claim 6, wherein the selectable option is presented upon an occurrence of a predetermined gaming activity event.

8. The method as in claim 7, wherein the predetermined gaming activity event is a predetermined symbol combination in a slot game.

9. The method as in claim 7, wherein the predetermined gaming activity event is a double-up feature associated with the gaming activity event.

10. The method as in claim 1, further comprising correlating the trade value with an appropriate bonus event, and wherein presenting the bonus activity to the player comprises providing a bonus event corresponding to the offered trade value to the player.

11. The method as in claim 1, wherein receiving an identification of a trade value comprises receiving a trade value identified by the player.

12. The method as in claim 1, wherein receiving an identification of a trade value comprises automatically receiving a predetermined trade value.

13. The method as in claim 1, wherein the player assets include credits presently subject to a winning payout.

14. The method as in claim 1, wherein the player assets include credits already accumulated through prior winning payouts.

15. The method as in claim 1, wherein the player assets include credits accumulated through input of new player assets.

16. The method as in claim 1, wherein presenting a bonus activity to the player comprises presenting a plurality of bonus activities to the player from which the player may select.

17. The method as in claim 1, wherein providing a payout result corresponding to the result of the player participation in the bonus activity comprises providing a winning payout result quantity proportional to the trade value offered by the player.

18. The method as in claim 1, wherein providing a payout result corresponding to the result of the player participation in the bonus activity comprises providing winning payout results having a frequency proportional to the trade value offered by the player.

19. The method as in claim 1, wherein the bonus activity is also automatically availed to the player, without receipt of a player request to trade player assets, upon an occurrence of one or more predetermined gaming events.

20. The method as in claim 19, wherein the one or more predetermined gaming events comprises one or more predetermined symbol combination in a slot game.

21. The method as in claim 1, wherein the bonus activity is availed to the player only through a trade.

22. The method as in claim 1, wherein accepting the trade value comprises accepting the trade value if it conforms to at least one predefined trade acceptance rule.

23. The method as in claim 1, further comprising receiving an eligibility payment to enable the player to be eligible to trade player assets for bonus activity.

24. A method for facilitating participation in gaming activity events, comprising:

receiving an indication to trade player assets for bonus activity;

receiving an identification of a trade value offered by the player, wherein the trade value comprises at least a portion of the player assets;

executing the trade by accepting the trade value offered by the player and presenting a bonus activity to the player in response thereto;

allowing player participation in the bonus activity;

providing a payout result corresponding to a result of the player participation in the bonus activity; and wherein presenting a bonus activity to the player comprises presenting at least one of a plurality of bonus activities based on the trade value offered by the player.

25. A method far facilitating participation in gaming activity events, comprising:

receiving an indication to trade player assets for bonus activity;

receiving an identification of a trade value offered by the player, wherein the trade value comprises at least a portion of the player assets;

executing the trade by accepting the trade value offered by the player and presenting a bonus activity to the player in response thereto;

allowing player participation in the bonus activity;

providing a payout result corresponding to a result of the player participation in the bonus activity;

wherein presenting a bonus activity comprises presenting a plurality of the bonus activities to the player, wherein a number of the bonus activities presented to the player is dependent on the trade value subject to the trade;

wherein allowing player participation comprises allowing player participation in each of the plurality of bonus activities presented; and wherein providing a payout result comprises providing the payout result for each of the plurality of bonus activities subject to the trade.

26. A method for facilitating participation in a slot game, comprising:

receiving an indication to trade credits for at least one slot bonus event;

receiving a credit amount offered by the player for the at least one slot bonus event;

accepting the credit amount offered by the player;

presenting the slot bonus event in response to accepting the credit amount;

facilitating player participation in the slot bonus event when the slot bonus event would be otherwise unavailable to the player during participation in the slot game; and providing a payout result corresponding to a result of the player participation in the slat bonus event.

27. The method as in claim 26, further comprising prompting the player to effect the indication to trade credits for the at least one slot bonus event.

28. The method as in claim 27, wherein receiving an indication to trade credits for at least one slot bonus event comprises receiving an unsolicited request by the player to trade credits for the at least one slot bonus event.

29. A method for participating in a gaming activity having at least a standard mode of play and a bonus mode of play, comprising:

participating in the standard mode of plays;

initiating a trade of gaming assets for at least one bonus event associated with the bonus mode;

identifying a trade amount from the participant's gaming assets in which to trade for the bonus event;

surrendering the trade amount in return for participation in the bonus event at a time dictated by the participant; and participating in the bonus event.

30. The method as in claim 29, further comprising returning to the standard mode of play upon completion of the participation in the bonus event.

31. The method as in claim 29, wherein initiating a trade comprises initiating the trade in response to an invitation by a gaming machine to initiate the trade.

32. The method as in claim 29, wherein initiating a trade comprises choosing to initiate the trade in response to presentation of a selectable option to engage in the trade.

33. The method as in claim 32, further comprising happening upon a predetermined gaming result in the standard mode of play which in response presents the selectable option to engage in the trade.

34. The method as in claim 29, wherein initiating a trade comprises initiating the trade of the participant's own volition.

35. The method as in claim 34, wherein initiating the trade of the participant's own volition comprises voluntarily trading gaming assets accumulated by the participant for the bonus event.

36. The method as in claim 29, wherein identifying a trade amount comprises complying with a predetermined trade cost schedule to determine the trade amount to be traded for the bonus event.

37. The method as in claim 29, wherein identifying a trade amount comprises trading a credit amount desired by the participant, and wherein a winning payout value is proportional to the credit amount traded by the participant.

38. The method as in claim 29, further comprising selecting one of a plurality of selectable bonus events available at the trade amount.

39. The method as in claim 29, further comprising selecting more than one of a plurality of selectable bonus events that are collectively available at the trade amount.

40. The method as in claim 29, further comprising participating in multiple occurrences of the bonus events, wherein surrendering the trade amount comprises surrendering a trade amount sufficient to allow participation in the multiple occurrences of the bonus event.

41. The method as in claim 29, wherein the gaming activity is a video casino game having at least a standard mode of play and a bonus mode of play available via a video casino machine.

42. The method as in claim 29, wherein the gaming activity is a slot game carried out on a slot machine.

43. The method as in claim 29, wherein the gaming activity is a poker game carried out on a video poker machine.

44. A casino gaming apparatus hosting a gaming activity having at least a standard mode of play and a bonus mode of play, the casino gaming apparatus comprising:

a user interface to allow player input of a trade notification, while in the standard mode of play, to trade player assets for at least one bonus event associated with the bonus mode of play; and a processor configured to execute the trade by accepting a traded portion of the player assets and presenting the player with the bonus event, otherwise unavailable to the player at that time in the standard mode of play, in response to acceptance of the traded portion of the player assets.

45. The casino gaming apparatus as in claim 44, further comprising a display device to display a video representation of the bonus event during player participation in the bonus event.

46. The casino gaming apparatus as in claim 44, wherein the user interface further allows entry of at least a portion of the player assets to allocate to the trade.

47. The casino gaming apparatus as in claim 44, wherein the processor comprises an arithmetic execution module to subtract the traded portion of the player assets from an accumulated credit total.

48. The casino gaming apparatus as in claim 44, wherein the processor comprises an arithmetic execution module to subtract the traded portion of the player assets from a pending winning payout result.

49. The casino gaming apparatus as in claim 44, further comprising a random number generator configured to generate a payout result for the bonus event.

50. The casino gaming apparatus as in claim 49, wherein the random number generator is integral to the processor.

51. The casino gaming apparatus as in claim 44, wherein the gaming activity is a slot game.

52. The casino gaming apparatus as in claim 44, wherein the gaming activity is a poker game.

53. The casino gaming apparatus as in claim 44, wherein the gaming activity is a keno game.

54. The casino gaming apparatus as in claim 44, wherein the gaming activity is a chance-based gaming activity.

55. A casino gaming apparatus for participating in a gaming event, the gaming event having an associated bonus activity made available to the player upon particular gaming occurrences of the gaming event, the casino gaming apparatus comprising:

means for receiving an indication to trade player assets for bonus activity;

means for receiving an identification of a trade value offered by the player, wherein the trade value comprises at least a portion of the player assets;

means for executing the trade;

means for allowing player participation in the bonus activity when the bonus activity would be otherwise unavailable to the player through participation in the gaming event; and means for providing a payout result corresponding to a result of the player participation in the bonus activity.

56. The casino gaming apparatus as in claim 55, wherein the means for executing the trade comprises means for accepting the trade value offered by the player, and means for presenting a bonus activity to the player in response thereto.

57. A computer-readable medium having computer-executable instructions for facilitating trade activity in gaming activity events that include at least one primary gaming activity and at least one bonus activity, the computer-executable instructions performing steps comprising:

receiving an indication to trade player assets for at least one bonus activity;

receiving an identification of a trade value offered by the player, wherein the trade value comprises at least a portion of the player assets;

executing the trade by accepting the trade value offered by the player, and in response presenting the bonus activity to the player when otherwise unavailable in connection with the primary gaming activity;

allowing player participation in the bonus activity; and providing a payout result corresponding to a result of the player participation in the bonus activity.

58. A computer-readable medium having computer-executable instructions for facilitating participation in a gaming activity having at least a standard mode of play and a bonus mode of play, the computer-executable instructions performing steps comprising:

participating in the standard mode of play;

initiating a trade of gaming assets for at least one bonus event associated with the bonus mode;

identifying a trade amount from the participant's gaming assets in which to trade for the bonus event;

surrendering the trade amount in return for participation in the bonus event at a time dictated by the participant; and participating in the bonus event.

* * * * *